(12) United States Patent
Deng (10) Patent No.: US 10,517,318 B2
(45) Date of Patent: Dec. 31, 2019

(54) VENDING MACHINE HAVING INTEGRATED FRESH ORANGE JUICE SQUEEZING, FILLING, BOTTLING AND MEDIA

(71) Applicant: Jun Deng, Beijing (CN)

(72) Inventor: Jun Deng, Beijing (CN)

( * ) Notice: Subject to any disclaimer, the term of this patent is extended or adjusted under 35 U.S.C. 154(b) by 343 days.

(21) Appl. No.: 15/622,872

(22) Filed: Jun. 14, 2017

(65) Prior Publication Data

US 2017/0325482 A1 Nov. 16, 2017

Related U.S. Application Data

(63) Continuation of application No. PCT/CN2015/095478, filed on Nov. 25, 2015.

(30) Foreign Application Priority Data

Dec. 19, 2014 (CN) .................... 2014 2 0806179 U (51) Int. Cl.
*A47J 19/00* (2006.01)
*A23N 1/00* (2006.01)
(Continued)

(52) U.S. Cl.
CPC ................ *A23L 2/06* (2013.01); *A23N 1/003* (2013.01); *A47J 19/02* (2013.01); *G07F 13/06* (2013.01); *G07F 13/10* (2013.01); *A23V 2002/00* (2013.01)

(58) Field of Classification Search
CPC .. A23N 1/003; A23N 1/00; A23L 2/06; G07F 13/10
(Continued)

(56) References Cited

U.S. PATENT DOCUMENTS 4,479,424 A * 10/1984 Carroll ................... A23N 1/003
100/116
5,544,572 A * 8/1996 Garmendia ............ A23N 1/003
99/484
(Continued)

FOREIGN PATENT DOCUMENTS

CN 104432359 A 3/2015
CN 104484949 A 4/2015
(Continued)

OTHER PUBLICATIONS

English Translation From International Search Report From PCT/CN2015/095478 dated Mar. 6, 2016 (3 pages).
(Continued)

*Primary Examiner* — Reginald Alexander
(74) *Attorney, Agent, or Firm* — Calfee, Halter & Griswold LLP (57) ABSTRACT

A vending machine having integrated orange juice squeezing, filling, bottling and media, including a box, an opening-closing door, an adjustable supporting base, a rotary material basket, a transportation guide apparatus, a juicer, an electric control valve, a filling container, a waste residue guide apparatus, a waste residue collection bucket, a high-pressure air pump, an air storage tank, a bottle, a bottle container, a bottle transportation mechanism, a bottle guide apparatus, a bottling transportation production-line, a rotary product-output apparatus, a spray water pump, a spray control electromagnetic valve, a finished product aisle, a spray water storage tank, a waste-liquid recovery water tank, a refrigeration-insulation system, a stable voltage power supply, a system control apparatus, an LED light and an ultraviolet germicidal light.

7 Claims, 6 Drawing Sheets

(51) Int. Cl.
*A23L 2/06* (2006.01)
*G07F 13/10* (2006.01)
*A47J 19/02* (2006.01)
*G07F 13/06* (2006.01)

(58) Field of Classification Search
USPC .................................. 99/501, 506, 513, 495
See application file for complete search history.

(56) References Cited

U.S. PATENT DOCUMENTS

| | | | |
|---|---|---|---|
| 2008/0028943 A1* | 2/2008 | Lee | A47J 19/02 |
| | | | 99/282 |
| 2009/0202687 A1 | 8/2009 | Griego et al. | |
| 2013/0160658 A1* | 6/2013 | Torrisi | A23N 1/00 |
| | | | 99/512 |
| 2017/0325483 A1 | 11/2017 | Deng | |

FOREIGN PATENT DOCUMENTS

| | | | | |
|---|---|---|---|---|
| CN | 104495734 A | 4/2015 | | |
| CN | 204390347 U | 6/2015 | | |
| CN | 204540681 U | 8/2015 | | |
| CN | 204550016 U | 8/2015 | | |
| EP | 3236436 A1 | 10/2017 | | |
| GB | 517707 | * | 2/1940 | ............... A23N 1/00 |
| GB | 546014 | * | 6/1942 | ............... A23N 1/00 |
| WO | 2012007406 A2 | 1/2012 | | |

OTHER PUBLICATIONS

Search Report from European Patent Application No. 15869182.4 dated May 7, 2018.

Office Action for Canadian Patent Application No. 2,971,077 dated Apr. 20, 2018.

* cited by examiner

VENDING MACHINE HAVING INTEGRATED FRESH ORANGE JUICE SQUEEZING, FILLING, BOTTLING AND MEDIA

CROSS-REFERENCE TO RELATED APPLICATIONS

The present application is a continuation of International Patent Application No. PCT/CN2015/095478, filed on Nov. 25, 2015, which claims priority to Chinese Patent Application No. 201420806179.5, filed on Dec. 19, 2014, the contents of both of which are incorporated herein by reference in their entireties.

TECHNICAL FIELD

The present application relates to a vending machine and, particularly, relates to a vending machine having integrated fresh orange juice squeezing, filling, bottling and media.

BACKGROUND

Orange juice obtained by squeezing orange materials through a juicer has delicious sweet and sour tastes, and has high nutritional value, and thus is very popular with consumers.

Automatically sold goods, particularly sold by beverage and food vending machines, are becoming more and more common in the market, which has brought much more convenience for people's daily life. However, goods sold by vending machines, for example, various vending machines including "Vending Machine" disclosed in Chinese patent literature CN 1194706 A, "Vending Machine" disclosed in Chinese patent literature CN 1236936 A, "Vending Machine" disclosed in Chinese patent literature CN 1707529 A, "Beverage Vending Machine" disclosed in Chinese patent literature CN 1624724 A, and "Vending Machine" disclosed in Chinese patent literature CN 1885358 A, placed in subway stations, shopping malls, airports, offices, railway stations and the like are all canned, bottled or soft packaged finished beverages after being deep processed and well packaged, and thus cannot meet the actual needs of people on freshly squeezed orange juice beverage.

At present, there is no vending machine in the market which can integrate orange juice squeezing, filling, bottling and media as a whole. However, the vending machine of the present application is a great innovation in the field of vending machines, which perfectly compensates for such vacancies of the market, and fundamentally meets the actual needs of the people.

SUMMARY

Technical Problem

The present application aims to provide a vending machine having integrated fresh orange juice squeezing, filling, bottling and media, so as to satisfy the daily needs of people.

Technical Solutions

The technical solution adopted by the present application includes:

A vending machine having integrated fresh orange juice squeezing, filling, bottling and media includes a box, an opening-closing door, an adjustable supporting base, a rotary material basket, a transportation guide apparatus, a juicer, an electric control valve, a filling container, a waste residue guide apparatus, a waste residue collection bucket, a high-pressure air pump, an air storage tank, a bottle, a bottle container, a bottle transportation mechanism, a bottle guide apparatus, a bottling transportation production line, a rotary product-output apparatus, a spray water pump, a spray control electromagnetic valve, a finished product aisle, a spray water storage tank, a waste liquid recovery water tank, a refrigeration insulation system, a stable voltage power supply, a system control apparatus, an LED light and an ultraviolet germicidal light.

The box includes a thin inner wall and a thin outer wall; an inner cavity is defined between the thin inner wall and the thin outer wall, and the inner cavity is filled with a foaming heat insulation material; a fixing bottom plate for juicer, a fixing bottom plate for bottling transportation production line, a fixing bottom plate for system control apparatus, a closed insulation cover for refrigeration insulation system, a bottom plate for box, a fixing bottom plate for bottle transportation mechanism and a fixing bottom plate for high-pressure air pump and air storage tank are provided within the box; the box further includes a back plate, and the back plate defines a heat dissipation hole for high-pressure air pump and a heat dissipation hole for refrigeration insulation system.

The opening-closing door is mounted on a front end of the box, and can be opened outwards through a rotary shaft pin fixed on the box; the opening-closing door includes a pick-up opening, a card plug-in area, a sensing area, a keyboard operation area, a man-machine interactive touch screen and a transparent TV set; the man-machine interactive touch screen is an area where a consumer conducts operations, and the consumer can operate according to relevant contents prompted on the man-machine interactive touch screen and purchases relevant products. Further, the man-machine interactive touch screen can real-time display data, the transparent TV set can display media advertisements, and the consumer or audience can watch the whole set of process flow in the vending machine from squeezing of a fresh orange to filling, bottling and the final outputting of the product while watching displayed media advertisements.

The adjustable supporting base is mounted at the bottom of the box, and is provided with a movable pulley.

The rotary material basket is placed at the top of the juicer and is connected with the box through a slide rail, and the rotary material basket can be freely pulled out or pushed in, so as to conveniently load fresh oranges.

One end of the transportation guide apparatus is connected with an outlet of the rotary material basket, and the other end of the transportation guide apparatus is connected with a feed inlet of the juicer.

The juicer is placed on a fixing bottom plate for juicer, and a spray cleaning pipeline is mounted in the juicer. Orange peels and waste residue produced during working of the juicer drop into the waste residue collection bucket through the waste residue guide apparatus.

The electric control valve is located below an orange juice outlet of the juicer and is connected with the orange juice outlet of the juicer. The electric control valve is switched on during squeezing of the juicer, and is switched off during filling of air.

The filling container is located below an outlet of the electric control valve and is connected with the outlet of the electric control valve. An outlet of the filling container is connected with a bottle filling position through a filling transportation pipeline.

The waste residue guide apparatus is located below a waste residue outlet of the juicer and is fixed on the box.

The waste residue collection bucket is placed above an upper left corner of a bottom plate for box and below the waste residue guide apparatus.

The high-pressure air pump and the air storage tank are placed on a fixing bottom plate for high-pressure air pump and air storage tank, and an air outlet of the air storage tank is connected with an air inlet of the electric control valve through an air pipe.

The bottle is placed in a bottle container.

The bottle container is located above the bottle transportation mechanism.

The bottle transportation mechanism is placed on a fixing bottom plate for bottle transportation mechanism.

The bottle guide apparatus and the bottle transportation mechanism cooperate to guarantee that the bottle drops into the bottle guide apparatus through the bottle transportation mechanism and freely falls to a bottle inlet position.

The bottling transportation production line is placed on a fixing bottom plate for bottling transportation production line, and is configured to complete a whole set of operating procedures including filling, capping, cap fastening and product outputting.

The rotary product-output apparatus is located on the bottling transportation production line.

The spray water storage tank is located above the bottom plate for box.

The spray water pump is located above the spray water storage tank and below the fixing bottom plate for bottling transportation production line; the spray control electromagnetic valve is mounted at the front of an outlet of the spray water pump, and the spray control electromagnetic valve plays a role in boosting pressure.

The finished product aisle includes a driving motor, a rotary spring and a product aisle framework; the finished product aisle is located above the bottling transportation production line, below the rotary material basket and at a right side of the juicer, and the finished product aisle is connected with the box through a slide rail; the finished product aisle can be freely pulled out and pushed in, so as to provide convenience for loading a finished product; the finished product which has already been canned, bottled or soft packaged are placed in the finished product aisle.

The waste liquid recovery water tank is located above the bottom plate for box, and is configured to collect waste residue liquid from the juicer after spray cleaning.

The refrigeration insulation system is placed in the closed insulation cover for refrigeration insulation system, and a condenser pipeline of the refrigeration insulation system is placed in the inner cavity defined between the thin inner wall and the thin outer wall and is tightly attached to the thin inner wall.

The LED light is placed in a groove provided at a bottom of the rotary material basket, and is configured to increase brightness in the box.

The ultraviolet germicidal light is placed at the bottom of the rotary material basket, and is configured to kill bacteria in the box of the vending machine.

The system control apparatus is placed on the fixing bottom plate for system control apparatus, and is connected with all the control components of the vending machine so as to realize automatic control of the vending machine.

The stable voltage power supply is placed above the closed insulation cover for refrigeration insulation system, and is connected with an external power supply to provide a stable power for the system control apparatus, so as to guarantee stability and safety of the whole vending machine.

Beneficial Effects:

As compared with the prior art, the beneficial effects brought by the vending machine of the present application include: a vending machine having integrated fresh orange juice squeezing, filling, bottling and media as a whole is provided, and the vending machine of the present application is a great innovation in the field of vending machines, which perfectly compensates for vacancies of the market, and fundamentally meets the actual needs of the people.

REFERENCE SIGNS

1—box; 101—fixing bottom plate for juicer; 102—fixing bottom plate for bottling transportation production line; 103—fixing bottom plate for system control apparatus; 104—closed insulation cover for refrigeration insulation system; 105—bottom plate for box; 106—fixing bottom plate for bottle transportation mechanism; 107—fixing bottom plate for high-pressure air pump and air storage tank; 108—heat dissipation hole for high-pressure air pump; 109—heat dissipation hole for refrigeration insulation system; 1010—thin inner wall; 1011—thin outer wall; 1012—back plate for box; 1013—inner cavity; 1014—foaming heat insulation material; 2—opening-closing door; 201—pick-up opening; 202—card plug-in area; 203—sensing area; 204—keyboard operation area; 205—man-machine interactive touch screen; 206—transparent TV set; 207—rotary shaft pin; 3—adjustable supporting base; 4—rotary material basket; 401—slide rail; 402—driving motor; 403—rotary table; 404—groove; 405—fresh orange; 5—transportation guide apparatus; 6—juicer; 601—spray cleaning pipeline; 7—electric control valve; 8—filling container; 801—filling transportation pipeline; 9—waste residue guide apparatus; 901—orange peel and waste residue; 10—waste residue collection bucket; 11—high-pressure air pump; 12—air storage tank; 13—bottle; 14—bottle container; 15—bottle transportation mechanism; 16—bottle guide apparatus; 17—bottling transportation production line; 1701—bottle inlet position; 1702—bottle transverse transportation mechanism; 1703—bottle filling position; 1704—bottle capping position; 1705—bottle cap fastening position; 18—rotary product-output apparatus; 19—spray water pump; 20—spray control electromagnetic valve; 21—finished product aisle; 2101—slide rail; 2102—driving motor; 2103—rotary spring; 2104—product aisle framework; 2105—finished product; 22—spray water storage tank; 23—waste liquid recovery water tank; 24—refrigeration insulation system; 2401—condenser pipeline; 25—stable voltage power supply; 26—system control apparatus; 27—LED light; 28—ultraviolet germicidal light.

DESCRIPTION OF EMBODIMENTS

The present application will be further illustrated as follows with reference to embodiments and accompanying drawings.

A vending machine having integrated orange juice squeezing, filling, bottling and media is provided. The vending machine includes a box 1, an opening-closing door 2, an adjustable supporting base 3, a rotary material basket 4, a transportation guide apparatus 5, a juicer 6, an electric control valve 7, a filling container 8, a waste residue guide apparatus 9, a waste residue collection bucket 10, a high-pressure air pump 11, an air storage tank 12, bottles 13, a bottle container 14, a bottle transportation mechanism 15, a bottle guide apparatus 16, a bottling transportation production line 17, a rotary product-output apparatus 18, a spray water pump 19, a spray control electromagnetic valve 20, a finished product aisle 21, a spray water storage tank 22, a waste liquid recovery tank 23, a refrigeration insulation system 24, a stable voltage power supply 25, a system control apparatus 26, an LED light 27 and an ultraviolet germicidal light 28.

Figure 3:
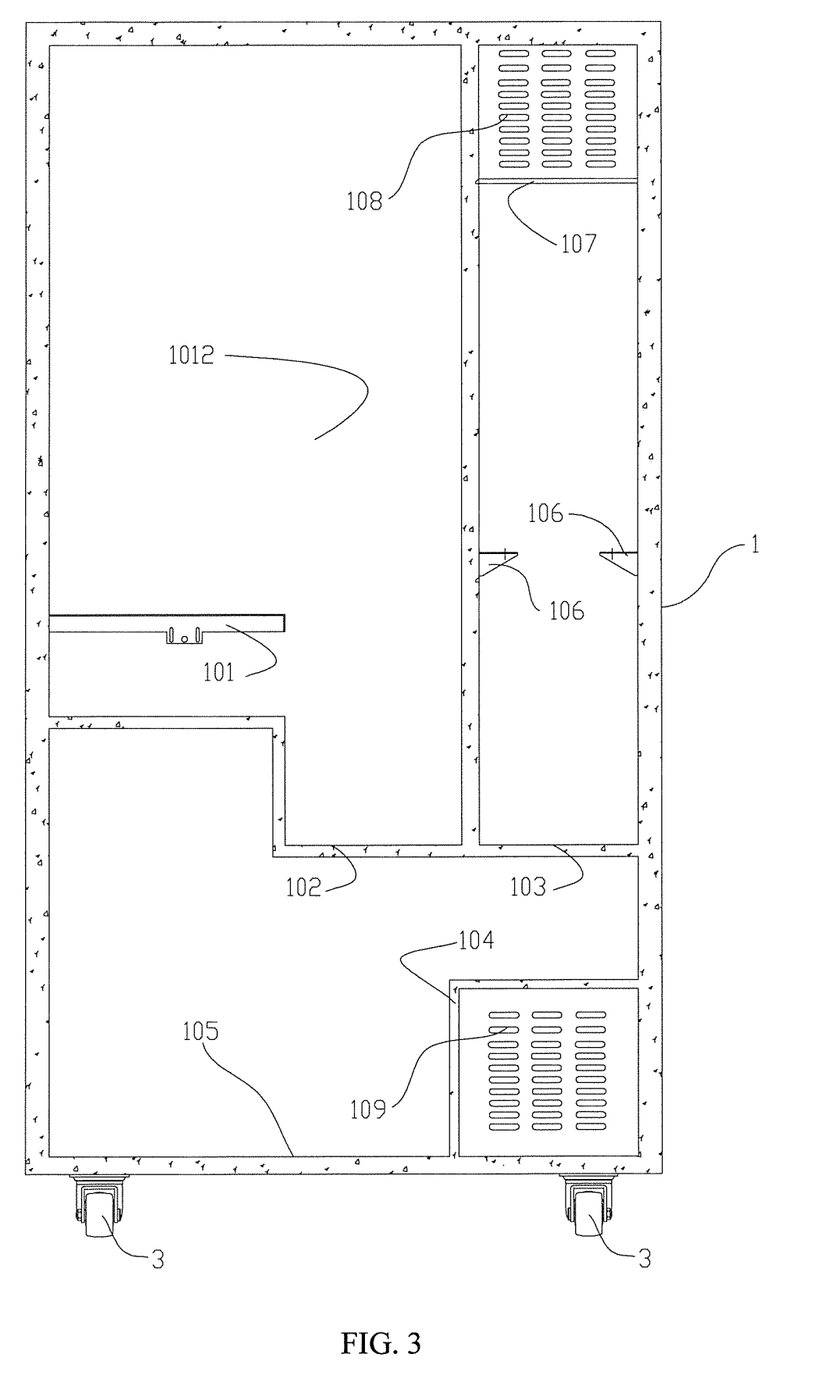
FIG. 3 is a structural schematic diagram of a box of the present application.
Figure 4:
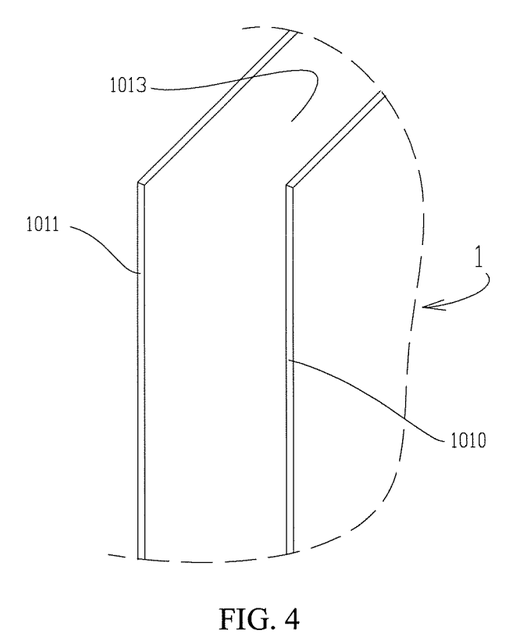
FIG. 4 is a partial sectional schematic diagram of a structural configuration of a box of the present application.
Figure 5:
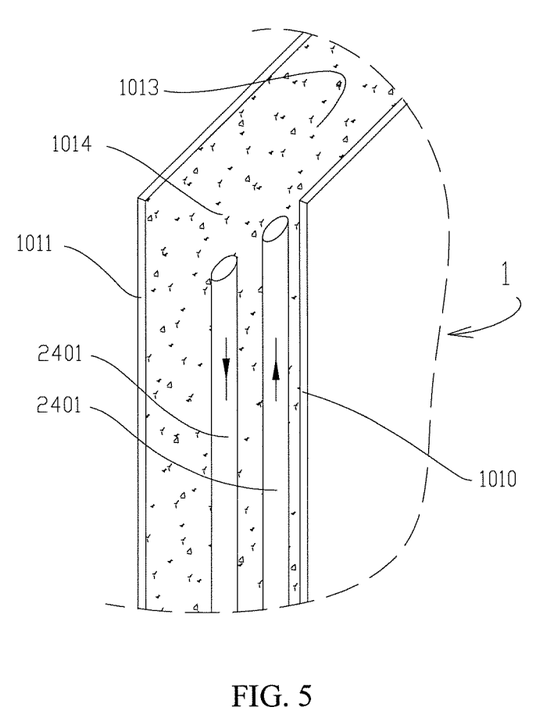
FIG. 5 is a sectional schematic diagram of heat insulation and a built-in condenser pipeline of a box of the present application.

The box 1 includes a thin inner wall 1010 and a thin outer wall 1011, an inner cavity 1013 is defined between the thin inner wall 1010 and the thin outer wall 1011, and the inner cavity 1013 is filled with a foaming heat insulation material 1014. An interior of the box 1 is provided with a fixing bottom plate 101 for juicer, a fixing bottom plate 102 for bottling transportation production line, a fixing bottom plate 103 for system control apparatus, a closed insulation cover 104 for refrigeration insulation system, a bottom plate 105 for box, a fixing bottom plate 106 for bottle transportation mechanism and a fixing bottom plate 107 for high-pressure air pump and air storage tank. The box 1 further includes a back plate 1012, and the back plate 1012 defines a heat dissipation hole 108 for high-pressure air pump and a heat dissipation hole 109 for refrigeration insulation system.

Figure 1:
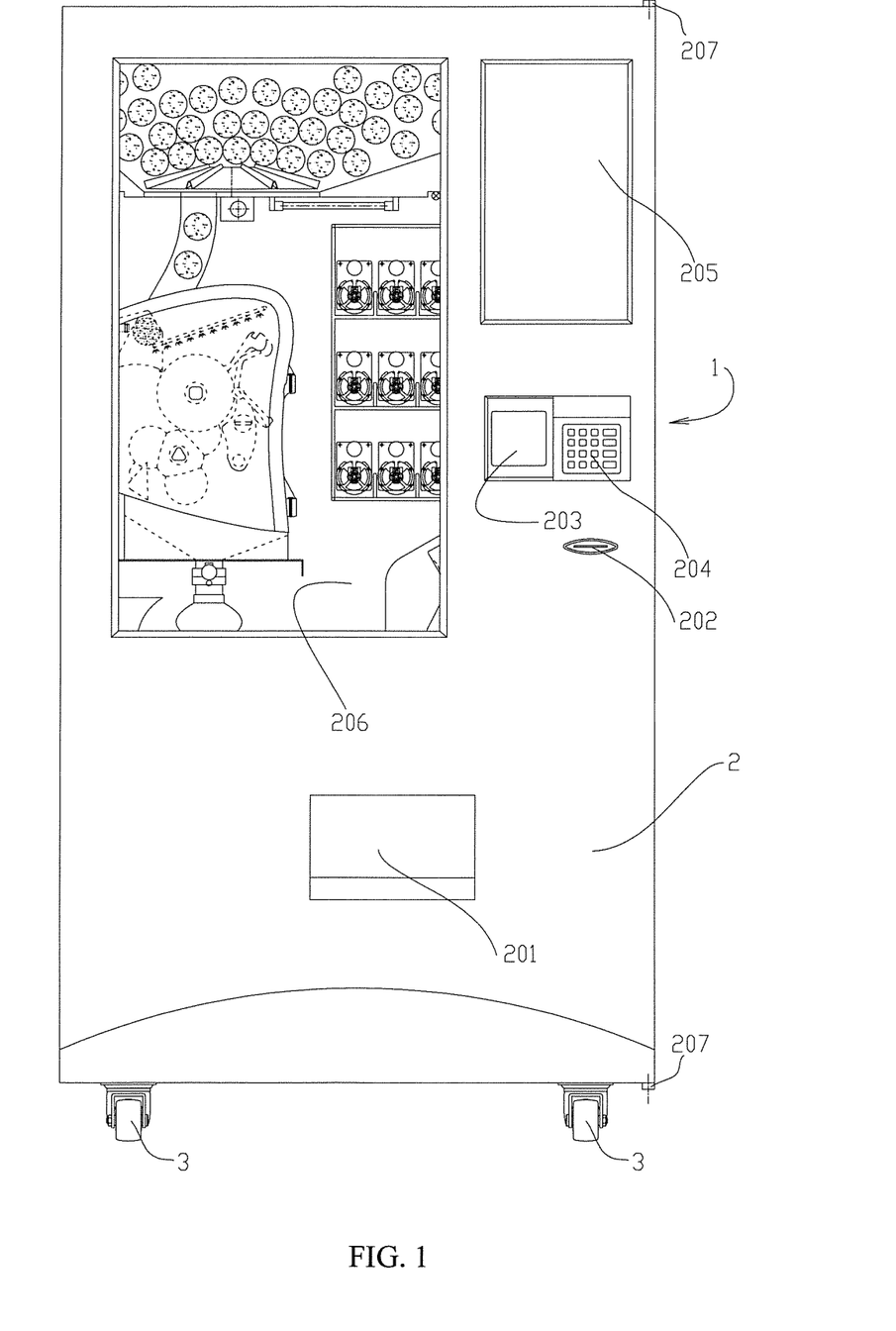
FIG. 1 is a front view of the present application.

The opening-closing door 2 is mounted on a front end of the box 1, and can be opened outwards through a rotary shaft pin 207 fixed on the box 1. The opening-closing door 2 includes a pick-up opening 201, a card plug-in area 202, a sensing area 203, a keyboard operation area 204, a man-machine interactive touch screen 205 and a transparent TV set 206. The man-machine interactive touch screen 205 is an area where a consumer conducts operations, and the consumer can operate according to relevant contents prompted on the man-machine interactive touch screen 205 and purchases relevant products. Further, the interactive touch screen 205 can real-time display data, the transparent TV set 206 can display media advertisements, and the consumer or audience can watch the entire process in the vending machine from squeezing of a fresh orange 405 to filling, bottling and the final outputting of the product while watching the displayed media advertisements.

Figure 2:
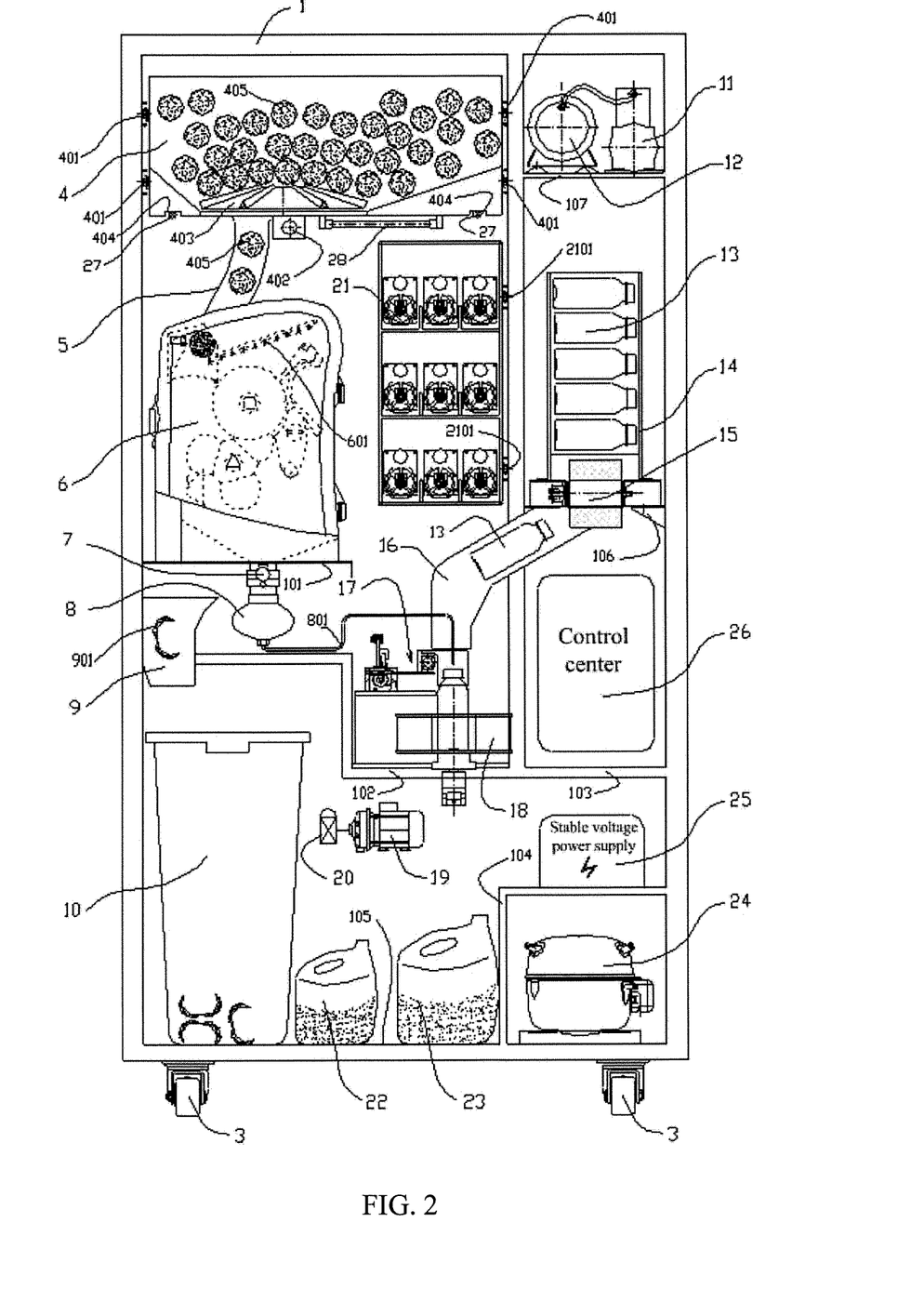
FIG. 2 is a structural schematic diagram of an internal structure layout of the present application.

The adjustable supporting base 3 is mounted at the bottom of the box 1, and is provided with a movable pulley.

The rotary material basket 4 is placed at the top of the juicer 6 and is connected with the box 1 through a slide rail 401, and the rotary material basket 4 can be freely pulled out or pushed in, so as to conveniently load fresh oranges 405.

One end of the transportation guide apparatus 5 is connected with an outlet of the rotary material basket 4, and the other end of the transportation guide apparatus 5 is connected with a feed inlet of the juicer 6.

The juicer 6 is placed on the fixing bottom plate 101 for juicer, and a spray cleaning pipeline 601 is mounted in the juicer 6. Orange peel and waste residue 901 produced during working of the juicer 6 drop into the waste residue collection bucket 10 through the waste residue guide apparatus 9.

The electric control valve 7 is located below an orange juice outlet of the juicer 6 and is connected with the orange juice outlet of the juicer 6. The electric control valve 7 is switched on during squeezing by the juicer 6, and is switched off during filling of air.

The filling container 8 is located below an outlet of the electric control valve 7 and is connected with the outlet of the electric control valve 7. An outlet of the filling container 8 is connected to a bottle filling position 1703 through a filling transportation pipeline 801.

The waste residue guide apparatus 9 is located below a waste residue outlet of the juicer 6 and is fixed on the box 1.

The waste residue collection bucket 10 is placed above an upper left corner of a bottom plate 105 for box and below the waste residue guide apparatus 9.

The high-pressure air pump 11 and the air storage tank 12 are placed on the fixing bottom plate 107 for high-pressure air pump and air storage tank, and an air outlet of the air storage tank 12 is connected with an air inlet of the electric control valve 7 through an air pipe.

The bottles 13 are placed in the bottle container 14.

The bottle container 14 is located above the bottle transportation mechanism 15.

The bottle transportation mechanism 15 is placed on a fixing bottom plate 106 for bottle transportation mechanism.

Figure 6:
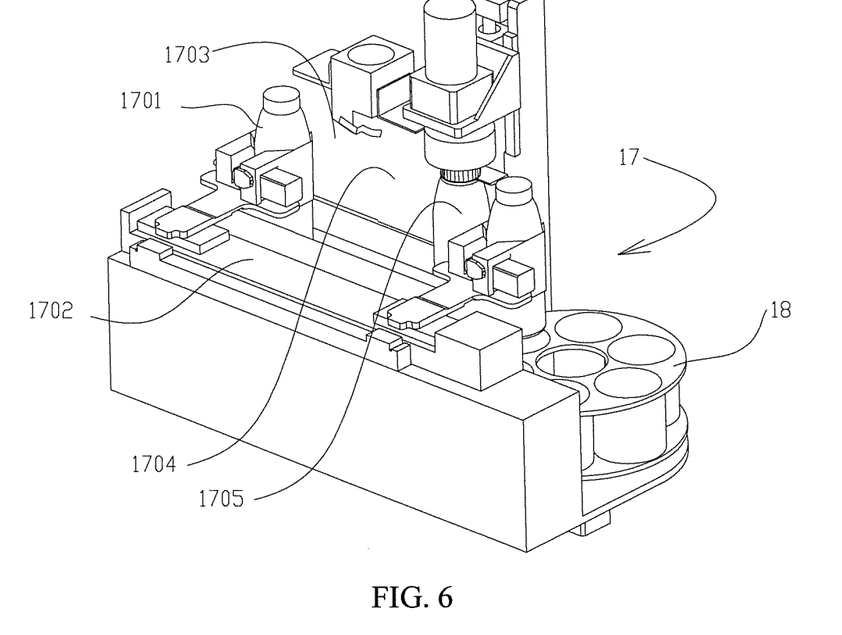
FIG. 6 is a structural schematic diagram of a bottling transportation production line of the present application in a forward direction.

The bottle guide apparatus 16 and the bottle transportation mechanism 15 cooperate to guarantee that the bottles 13 drop into the bottle guide apparatus 16 through the bottle transportation mechanism 15 and freely fall to a bottle inlet position 1701.

Figure 7:
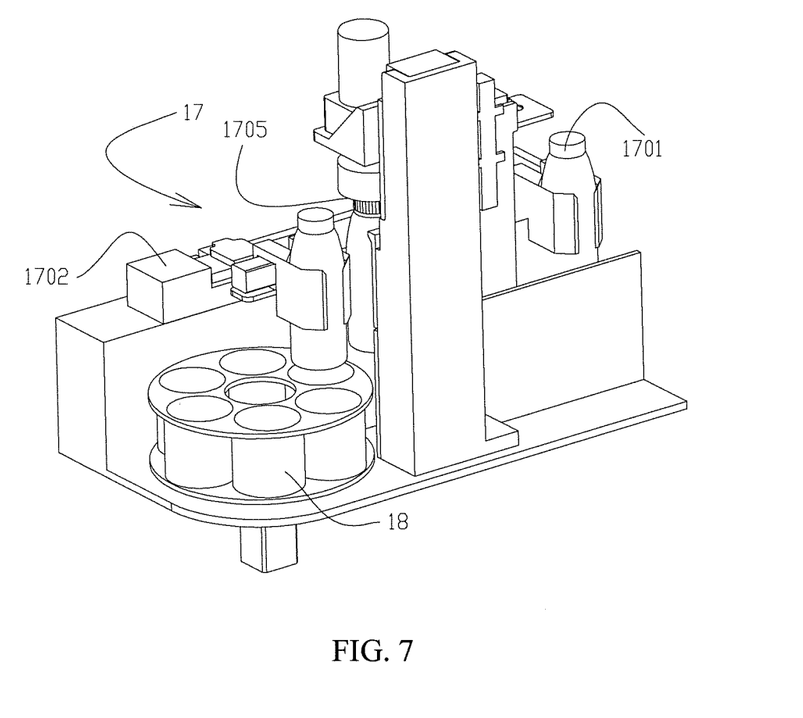
FIG. 7 is a structural schematic diagram of a bottling transportation production line of the present application in a backward direction.

The bottling transportation production line 17 is placed on a fixing bottom plate 102 for bottling transportation production line, and is configured to complete a whole set of operating procedures including filling, capping, cap fastening and product outputting.

The rotary product-output apparatus 18 is located on the bottling transportation production line 17.

The spray water storage tank 22 is located above the bottom plate 105 for box.

The spray water pump 19 is located above the spray water storage tank 22 and below the fixing bottom plate 102 for bottling transportation production line. The spray control electromagnetic valve 20 is mounted before an outlet of the spray water pump 19, and the spray control electromagnetic valve 20 plays a role in boosting pressure.

Figure 8:
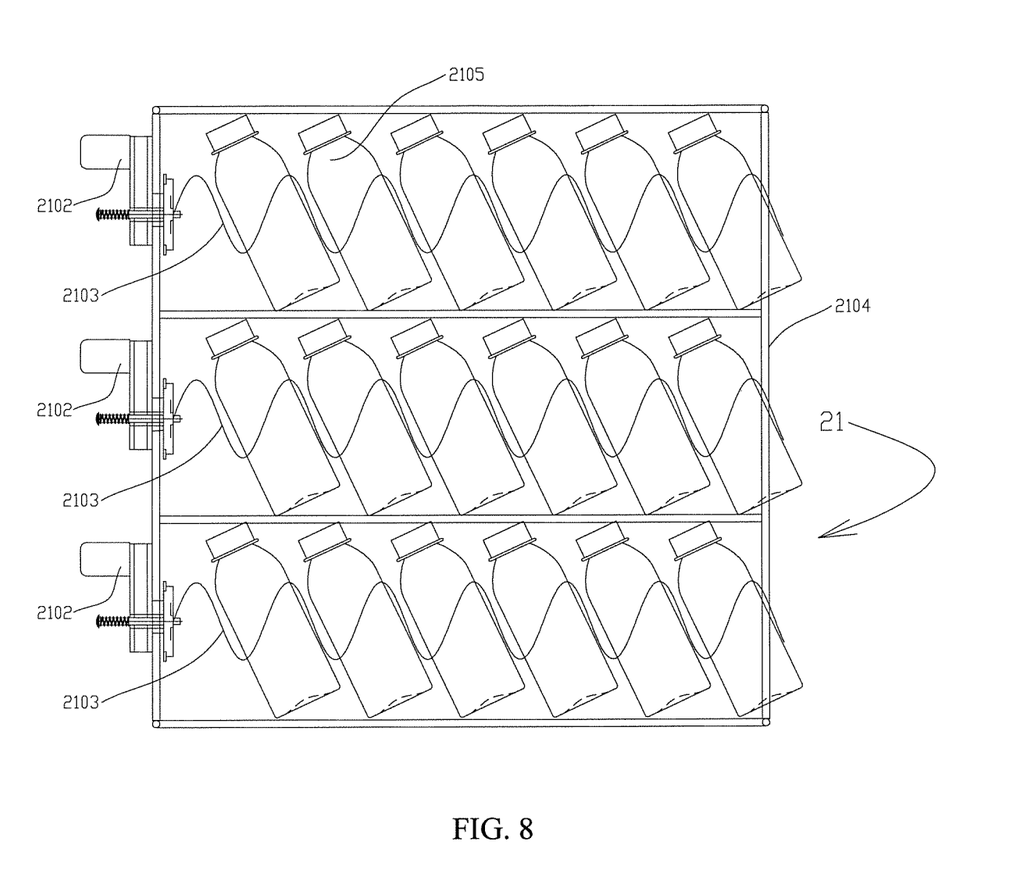
FIG. 8 is a front view of a finished product aisle of the present application.

The finished product aisle 21 includes a driving motor 2102, a rotary spring 2103 and a product aisle framework 2104. The finished product aisle 21 is located above the bottling transportation production line 17, below the rotary material basket 4 and at a right side of the juicer 6, and the finished product aisle 21 is connected with the box 1 through a slide rail 2101. The finished product aisle 21 can be freely pulled out and pushed in, so as to provide convenience for loading finished products 2105. The finished product 2105 which has already been canned, bottled or soft packaged is placed in the finished product aisle 21.

The waste liquid recovery water tank 23 is located above the bottom plate 105 for box, and is configured to collect waste residue liquid from the juicer 6 after spray cleaning.

The refrigeration insulation system 24 is placed in the closed insulation cover 104 for refrigeration insulation system, and a condenser pipeline 2401 of the refrigeration insulation system 24 is placed in the inner cavity 1013 defined between the thin inner wall 1010 and the thin outer wall 1011 and is tightly attached to the thin inner wall 1010.

The LED light 27 is placed in a groove 404 provided at the bottom of the rotary material basket 4, and is configured to increase brightness in the box 1.

The ultraviolet germicidal light 28 is placed at the bottom of the rotary material basket 4, and is configured to kill bacteria in the box 1 of the vending machine.

The system control apparatus 26 is placed on the fixing bottom plate 103 for system control apparatus, and is connected with all the control components of the vending machine so as to realize automatic control of the vending machine.

The stable voltage power supply 25 is placed above the closed insulation cover 104 for refrigeration insulation system, and is connected with an external power supply to provide a stable power for the system control apparatus 26, so as to guarantee stability and safety of the whole vending machine.

Embodiment 1 A Consumer Purchases Freshly Squeezed Orange Juice

1. The refrigeration insulation system 24 is kept in a working state under a constant inner temperature of the box 1 when the vending machine is switched on, and the inner temperature of the box 1 is adjustable.

2. The ultraviolet germicidal light 28 intermittently works for a whole day under control of the system control apparatus 26.

3. The transparent TV set 206 loops media advertisements for a whole day.

4. The consumer clicks the man-machine interactive touch screen 205 to select and purchase a relevant product, after determination is made, then selects a mode of payment; the payment can be realized by the card plug-in area 202, the sensing area 203 and the keyboard operation area 204; after the payment is successfully completed, the man-machine interactive touch screen 205 will display to prompt the consumer to wait while the squeezing for the fresh orange juice is ongoing. During waiting, the consumer can watch the media advertisements through the transparent TV set 206. Since the transparent TV set 206 is transparent, the consumer can at the same time watch the whole set of processing procedure from squeezing of the fresh orange 405 to filling, bottling and the final outputting of the product while watching the media advertisements.

5. Process flow for freshly squeezed orange juice:

A rotary table 403 in the rotary material basket 4 is driven by a driving motor 402 to stir the oranges 405, so that the oranges 405 drop from the outlet of the rotary material basket 4 to the transportation guide apparatus 5 one by one, then, the fresh oranges 405 enter into the juicer 6 through the transportation guide apparatus 5; during squeezing, the generated orange peel and waste residue 901 drop into the waste residue collection bucket 10 through the waste residue guide apparatus 9, while the freshly squeezed orange juice flows into the filling container 8, and the electric control valve 7 automatically rotates to be off and waits for filling; meanwhile, the bottle 13 is transported to the bottle guide apparatus 16 though the bottle transportation mechanism 15 and freely falls to the bottle inlet position 1701, and then the bottle 13 at the bottle inlet position 1701 is transported to the bottle filling position 1703 through a bottle transverse transportation mechanism 1702 to wait for filling; air in the air storage tank 12 is rapidly injected into the filling container 8 by the high-pressure air pump 11, and the high-pressure air generated by the high-pressure air pump 11 rapidly injects the freshly squeezed orange juice in the filling container 8 into the bottle 13 waiting at the bottle filling position 1703 through the filling transportation pipeline 801; after the filling is finished, the bottle 13 at the bottle filling position 1703 is then transported to a bottle capping position 1704 through the bottle transverse transportation mechanism 1702 to be capped, the capped bottle is then transported to a bottle cap fastening position 1705 to be tightly capped, and then the bottle transverse transportation mechanism 1702 transports the bottle 13 after being tightly capped into a rotary product-output apparatus 18; the rotary product-output apparatus 18 rotates and transports a finished product to the product outlet, the finished product then freely drops into the pick-up opening 201 and the vending machine prompts the consumer to pick up the product.

6. The purchasing of the freshly squeezed orange juice is finished.

Embodiment 2 A Consumer Purchases a Finished Beverage

1. The consumer clicks the man-machine interactive touch screen 205 and selects to purchase a relevant finished product, after determination is made, then selects a mode of payment; the payment can be realized by the card plug-in area 202, the sensing area 203 and the keyboard operation area 204; after the payment is successfully completed, the man-machine interactive touch screen 205 will display to prompt the consumer to wait while the squeezing for the fresh orange juice is ongoing; during the waiting, the consumer can watch media advertisements through the transparent TV set 206. Since the transparent TV set 206 is transparent, the consumer can watch the inner working state of the vending machine while watching the media advertisements.

2. Process flow: the rotary spring 2103 in the finished product aisle 21 is driven by the driving motor 2102 to rotate and moves forward together with the finished product 2105, the finished product 2105 moves forward as a function of the rotation of the rotary spring 2103 and drops into the pick-up opening 201, and then the vending machine prompts the consumer to pick up the product.

3. The purchasing of the finished product is finished.

The above-mentioned embodiments illustrate technical principles of the present application. However, these embodiments are merely used to explain the principles of the present application but should not be interpreted in any manner to limit the protection scope of the present application. Based on explanations herein, all other embodiments of the present application obtained by those skilled in the art without paying any creative effort shall fall into the protection scope of the present application.

What is claimed is:

1. A vending machine having integrated fresh orange juice squeezing, filling, bottling and media, comprising a box, an opening-closing door, an adjustable supporting base, a rotary material basket, a transportation guide apparatus, a juicer, an electric control valve, a filling container, a waste residue guide apparatus, a waste residue collection bucket, a high-pressure air pump, an air storage tank, a bottle, a bottle container, a bottle transportation mechanism, a bottle guide apparatus, a bottling transportation production line, a rotary product-output apparatus, a spray water pump, a spray control electromagnetic valve, a finished product aisle, a spray water storage tank, a waste liquid recovery water tank, a refrigeration insulation system, a stable voltage power supply, a system control apparatus, an LED light and an ultraviolet germicidal light, wherein the adjustable supporting base is mounted at a bottom of the box; the rotary material basket is placed at a top of the juicer and is connected with the box through a slide rail; one end of the transportation guide apparatus is connected with an outlet of the rotary material basket, and the other end of the transportation guide apparatus is connected with a feed inlet of the juicer; the juicer is placed on a fixing bottom plate for the juicer, and a spray cleaning pipeline is mounted in the juicer; the electric control valve is located below an orange juice outlet of the juicer and is connected with the orange juice outlet of the juicer; the filling container is located below an outlet of the electric control valve and is connected with the outlet of the electric control valve; an outlet of the filling container is connected with a bottle filling position through a filling transportation pipeline; the waste residue guide apparatus is located below a waste residue outlet of the juicer and is fixed on the box; the waste residue collection bucket is placed above an upper left corner of a bottom plate for the box and below the waste residue guide apparatus; the high-pressure air pump and the air storage tank are placed on a fixing bottom plate for the high-pressure air pump and the air storage tank, and an air outlet of the air storage tank is connected with an air inlet of the electric control valve through an air pipe; the bottle container is located above the bottle transportation mechanism; the bottle transportation mechanism is placed on a fixing bottom plate for the bottle transportation mechanism; the bottle guide apparatus cooperates with the bottle transportation mechanism; the bottling transportation production line is placed on a fixing bottom plate for the bottling transportation production line; the rotary product-output apparatus is located on the bottling transportation production line, the spray water storage tank is located above the bottom plate for the box; the spray water pump is located above the spray water storage tank and below the fixing bottom plate for the bottling transportation production line; the LED light is placed in a groove provided at a bottom of the rotary material basket; and the ultraviolet germicidal light is placed at the bottom of the rotary material basket.

2. The vending machine having integrated fresh orange juice squeezing, filling, bottling and media according to claim 1, wherein the box comprises a thin inner wall and a thin outer wall; an inner cavity is defined between the thin inner wall and the thin outer wall, and the inner cavity is filled with a foaming heat insulation material;

the fixing bottom plate for the juicer, the fixing bottom plate for the bottling transportation production line, a fixing bottom plate for system control apparatus, a closed insulation cover for the refrigeration insulation system, the bottom plate for the box, the fixing bottom plate for the bottle transportation mechanism and the fixing bottom plate for the high-pressure air pump and the air storage tank are provided within the box; and the box further comprises a back plate, and the back plate defines a heat dissipation hole for the high-pressure air pump and a heat dissipation hole for the refrigeration insulation system.

3. The vending machine having integrated fresh orange juice squeezing, filling, bottling and media according to claim 1, wherein the opening-closing door is mounted on a front end of the box, and can be opened outwards through a rotary shaft pin fixed on the box; the opening-closing door comprises a pick-up opening, a card plug-in area, a sensing area, a keyboard operation area, an man-machine interactive touch screen and a transparent TV set.

4. The vending machine having integrated fresh orange juice squeezing, filling, bottling and media according to claim 3, wherein the transparent TV set is embedded in the opening-closing door.

5. The vending machine having integrated fresh orange juice squeezing, filling, bottling and media according to claim 1, wherein the finished product aisle comprises a driving motor, a rotary spring and a product aisle framework; the finished product aisle is located above the bottling transportation production line, below the rotary material basket and at a right side of the juicer; the finished product aisle is connected with the box through a slide rail; and the finished product aisle can be freely pulled out and pushed in so as to facilitate loading of a finished product.

6. The vending machine having integrated fresh orange juice squeezing, filling, bottling and media according to claim 1, wherein the refrigeration insulation system is placed in the closed insulation cover for the refrigeration insulation system, and a condenser pipeline of the refrigeration insulation system is placed in the inner cavity defined between the thin inner wall and the thin outer wall and is tightly attached to the thin inner wall.

7. The vending machine having integrated fresh orange juice squeezing, filling, bottling and media according to claim 1, wherein the LED light is configured to illuminate.

* * * * *